Oct. 14, 1941. H. S. SMITH Re. 21,925

SINK FIXTURE

Original Filed Feb. 1, 1940

INVENTOR.
HORACE S. SMITH

BY

Kwis Hudsone Kent
ATTORNEYS

Reissued Oct. 14, 1941

Re. 21,925

UNITED STATES PATENT OFFICE 21,925

SINK FIXTURE

Horace S. Smith, Kinsman, Ohio, assignor to The Glauber Brass Manufacturing Company, Kinsman, Ohio, a corporation of Ohio Original No. 2,218,662, dated October 22, 1940, Serial No. 316,804, February 1, 1940. Application for reissue filed July 10, 1941, Serial No. 401,791

4 Claims. (Cl. 277—57)

This invention relates to improvements in sink fixtures, and has to do with combination fixtures in which valves for hot and cold water are incorporated to control the flow of either one or a mixture of both from a common exit. Fixtures of this kind commonly employ a swing spout disposed between the two valves through which the water is delivered. It is also known to provide in addition to the swing spout a hose connection with a spray nozzle on the extremity thereof through which water may be delivered if desired and to provide a diverter valve by means of which the operator may cause water to flow alternatively either to the spout or to the spray nozzle. The present invention is concerned with an improved means for accomplishing the latter purpose.

One of the objects of the invention is the provision of a screw valve cooperating with either of two opposed valve seats, which are immovably positioned, one in each of two separable parts of a valve body, and with which a double valve piece embodying two non-metallic washers cooperates.

Another object of the invention is the provision of diverter valve apparatus which shall be readily accessible for repair or replacement.

Figure 1:
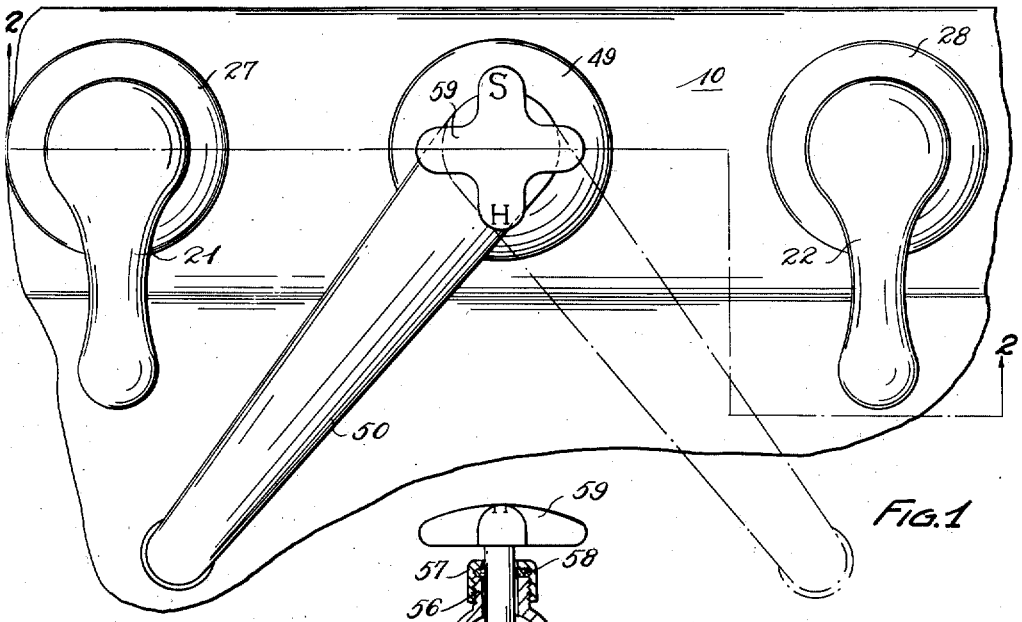

Other objects and features of novelty will appear as I proceed with the description of that embodiment of the invention which, for the purposes of the present application, I have illustrated in the accompanying drawing, in which Fig. 1 is a plan view of a sink fixture embodying the invention.

Figure 2:
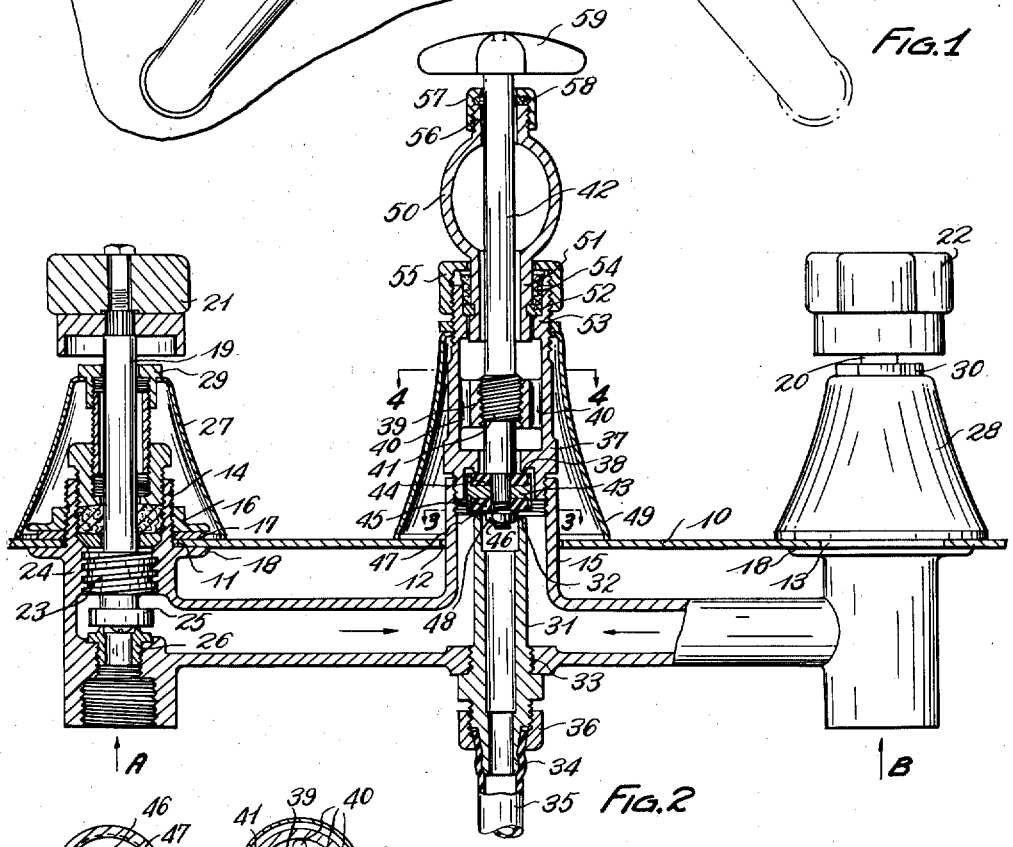

Fig. 2 is a vertical section taken substantially on the line 2—2 of Fig. 1.

Figure 3:
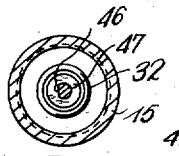
Figure 4:
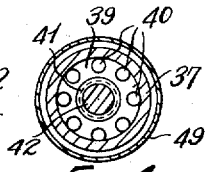

Figs. 3 and 4 are horizontal detail sectional views taken substantially on the lines 3—3 and 4—4 respectively of Fig. 2.

In the drawing, 10 represents the ledge of a metal sink directly behind the sink cavity. Suitable openings 11, 12 and 13 are provided in this ledge for the reception of the upstanding parts of a valve body located otherwise beneath the ledge. These upstanding parts comprise threaded sleeves 14 at each end of the fixture, one only of which is illustrated, and a central sleeve 15. The fixture is clamped to the ledge 10 by means of nuts 16 threaded on the two sleeves 14 and working through washers 17 to grip the ledge against radial flanges 18 on the fixture below the ledge.

Two valve stems 19 and 20 with handles 21 and 22 at their upper ends are provided for turning on or off the hot and cold water respectively. These valves may be identical in construction, and as illustrated at the left side of Fig. 2, may comprise a threaded collar 23 turning in a correspondingly threaded wall 24 and having a valve piece 25 arranged to engage a removable and replaceable valve seat member 26. In order to present a smooth exterior these control valves comprise metal escutcheons 27 and 28 which are preferably plated and polished and are held in position by clamping nuts 29 and 30.

Hot and cold water, represented by the arrows A and B, may enter the valve body when the control valves at the ends of the fixture are open and will then flow inwardly toward and into the central sleeve member 15. Positioned centrally within the latter member there is a tubular casting 31 with a valve seat 32 at its upper end. This casting is threadably mounted in the valve body at 33 and has a downwardly projecting nipple 34 for receiving a flexible rubber hose 35 which is clamped to the nipple by a hollow nut 36. While not herein illustrated, it is to be understood that the hose 35 may extend upwardly through an opening in the ledge 10 and may carry on its opposite extremity a spray nozzle for rinsing dishes, fruit, and the like.

The valve body above the sleeve member 15 has an upwardly continuing portion 37 roughly cylindrical in shape which is provided with a downwardly facing valve seat 38 that is opposed to and spaced from valve seat 32. The body member 37 is preferably mounted in the sleeve member 15 by a threaded joint as shown and is hollow to provide a path for water to flow upwardly from the valve seat 38. Intermediate its length this body member has a spider or bridge 39 in which are formed a series of perforations 40 arranged in a circle surrounding a central threaded opening in which is mounted a threaded portion 41 of the valve stem 42. This valve stem has a reduced lower end upon which is mounted a metal washer 43 with peripheral flanges extending both upwardly and downwardly. Gaskets 44 and 45 are positioned in the cavities formed by these flanges, the upper gasket being adapted to engage valve seat 38 and the lower gasket being adapted to engage valve seat 32. The lower extremity of the stem 42 is threaded and has a flattened side indicated at 46, Fig. 3, in order to receive a D-washer 47. A nut 48 threaded onto the stem works through D-washer 47 to clamp the washer 43 with its gaskets 44 and 45 against the shoulder at the upper end of the reduced portion of the stem the D-washer acting as a lock to prevent accidental loosening of the mounting for the gaskets. Obviously, when the stem is threaded downwardly gasket 45 engages seat 32 and provides a passage for water upwardly, while threading the stem upwardly unseats gasket 45 and causes gasket 44 to engage seat 38, thereby providing a passage for water downwardly through casting 31. On this central part of the fixture an escutcheon 49 similar to the escutcheons 27 and 28 is employed.

50 is a swing spout which at its rear end has a downwardly projecting hollow trunnion 51 that extends into body member 37 and has a bore of larger diameter than the external diameter of the stem 42. Suitable means are provided to rotatably support the trunnion 51 within the body member 37 which, in the illustrated embodiment, comprises a split spring ring 52 that is set within an annular groove formed in the trunnion, the ring 52 resting upon an annular shoulder 53 of the body member. Above the ring there is a suitable packing 54 which is held in place by a gland nut 55. A short tubular extension 56 is provided on the upper side of the spout 50 in alignment with the trunnion 51, through which the stem 42 protrudes with clearance. This extension is threaded externally to receive a gland nut 57 covering packing 58.

A hand wheel 59, or other form of hand grip, is secured to the upper end of stem 42 for convenience in turning the latter. The threads 41 are relatively coarse and preferably of such pitch that a 180° movement of the stem is sufficient to actuate the diverter valve from one operative position to the other. In order that the operator may know how the valve is set at any given time the handle 59 may be marked to provide that information, as for example by the letters H, meaning hose, and S, meaning spout. When the H is forward, as in Fig. 1, the valve is set to cause flow of water through the hose. When the handle 59 is turned from that position clockwise through 180° however the letter S will be in front, which will indicate that the valve is set to cause flow of water through the spout.

It will be observed that both of the valve seats 32 and 38 are portions of the valve body and are therefore fixed in position at all times. Also, the operation of the valve by screw action provides positive engagement of the valve with either one of its seats, eliminating any leakage of water from the outlet not then in use and serving to hold the stem against rotation when the spout 50 is swung from one position to the other.

Having thus described my invention, I claim:

1. In a combination fixture, a central upright valve body of two separable aligned parts, said body having therein opposed spaced valve seats, one in each of said parts, through which water may flow upwardly or downwardly, a swing spout mounted in the upper one of said valve body parts, a valve stem extending through the said spout concentric with the axis around which the spout turns and threadably mounted in the upper one of said valve body parts below said spout, a double valve piece on the stem having upper and lower washers of non-metallic material for engagement with one or the other of said valve seats alternatively, and a handle at the upper end of said stem above said spout operative through a predetermined angle regardless of the angular position of the spout for moving the valve from one operative position to the other.

2. In a combination fixture, a central upright valve body of two separable aligned parts, said body having therein opposed spaced valve seats, one in each of said parts, through which water may flow upwardly or downwardly, a swing spout mounted in the upper one of said valve body parts, a valve stem extending through the said spout concentric with the axis around which the spout turns and threadably mounted in the upper one of said valve body parts below said spout, a double valve piece on the stem having upper and lower washers of non-metallic material for engagement with one or the other of said valve seats alternatively, the joint between said valve body parts being located at a point intermediate the positions of the two valve seats, and a handle at the upper end of said stem above said spout operative through a predetermined angle regardless of the angular position of the spout for moving the valve from one operative position to the other.

3. In a combination fixture, a horizontal conduit, a valve at each end of said conduit, a sleeve member extending upwardly from the middle of said conduit, a tubular member extending upwardly from said conduit into said sleeve member and having a projecting lower end carrying a nipple for attachment to a flexible hose, a valve seat at the top of said tubular member, a body member removably secured to said sleeve member and extending upwardly therefrom, a downwardly facing seat in said body member, a diverter valve stem in said body member carrying a double valve piece adapted to cooperate alternatively with either of said seats, a swing spout oscillatably mounted in the upper end of said body member concentric with said stem, and a handle for the stem above said swing spout whereby the diverter valve mechanism is located entirely above the said horizontal conduit for accessibility in servicing.

4. In a combination fixture, a central upright valve body of two separable aligned parts, said body having therein opposed spaced valve seats, one in each of said parts, through which water may flow upwardly or downwardly, a swing spout mounted in the upper one of said valve body parts, a valve stem extending through the said spout concentric with the axis around which the spout turns and threadably mounted in the upper one of said valve body parts below said spout, a removable double valve piece on the stem having upper and lower washers of non-metallic material for engagement with one or the other of said valve seats alternatively, and a handle at the upper end of said stem above said spout operative through a predetermined angle regardless of the angular position of the spout for moving the valve from one operative position to the other.

HORACE S. SMITH.